US012297849B2

(12) United States Patent
Bueter

(10) Patent No.: US 12,297,849 B2
(45) Date of Patent: May 13, 2025

(54) CYLINDER DEGASSING UNIT AND WORKING CYLINDER

(71) Applicant: BÜMACH ENGINEERING INTERNATIONAL B. V., TA Emmen (NL)

(72) Inventor: Josef Bueter, Haren/Altenberge (DE)

(73) Assignee: Bümach Engineering International B.V., TA Emmen (NL)

( * ) Notice: Subject to any disclaimer, the term of this patent is extended or adjusted under 35 U.S.C. 154(b) by 0 days.

(21) Appl. No.: 18/697,498

(22) PCT Filed: Oct. 12, 2021

(86) PCT No.: PCT/DE2021/000169
§ 371 (c)(1),
(2) Date: Apr. 1, 2024

(87) PCT Pub. No.: WO2023/061522
PCT Pub. Date: Apr. 20, 2023

(65) Prior Publication Data

US 2024/0410403 A1 Dec. 12, 2024

(51) Int. Cl.
*F15B 21/04* (2019.01)
*F15B 21/044* (2019.01)

(52) U.S. Cl.
CPC .................................. *F15B 21/044* (2013.01)

(58) Field of Classification Search
CPC ....... F15B 21/047; F15B 21/044; F16K 24/04
See application file for complete search history.

(56) References Cited

U.S. PATENT DOCUMENTS 7,951,474 B2 * 5/2011 Schembri ............ H01M 50/325 429/61

FOREIGN PATENT DOCUMENTS

| | | | | | |
|---|---|---|---|---|---|
| CN | 211314725 | U | | 8/2020 | |
| DE | 1158784 | A | | 12/1963 | |
| DE | 2419118 | A | * | 11/1975 | ............ F15B 15/224 |
| DE | 124827 | A1 | | 3/1977 | |
| DE | 10155793 | A1 | | 8/2002 | |
| DE | 202005003835 | U1 | | 6/2005 | |
| DE | 102008041115 | A1 | | 2/2010 | |
| DE | 202011102288 | U1 | * | 1/2012 | ........... F16K 15/044 |
| DE | 102015218058 | A1 | | 3/2017 | |

(Continued)

*Primary Examiner* — Abiy Teka
(74) *Attorney, Agent, or Firm* — Laurence A. Greenberg; Werner H. Stemer; Ralph E. Locher

(57) ABSTRACT

A degassing unit has a basic body with an inner discharge portion, an annular chamber an outer discharge portion. The body is to be fixed at a perforation of a cylinder residual air space. The inner discharge portion has an inner discharge channel and an inner annular body. The inner discharge channel connects the air space to the chamber. The inner annular body covers an intermediate outlet of the inner discharge channel and defines a first pressure barrier in a discharge direction and a second sealing plane in an inlet direction. The outer discharge portion has an outer discharge channel and an outer annular body. The outer channel connects the chamber to atmosphere via an intermediate inlet at the chamber and an outer outlet to atmosphere. The outer annular body covers the outer outlet and defines a second pressure barrier in an outlet direction and a second sealing plane in an inlet direction.

7 Claims, 2 Drawing Sheets

(56) References Cited

FOREIGN PATENT DOCUMENTS

| | | | |
|---|---|---|---|
| EP | 0515215 | A1 | 11/1992 |
| FR | 2321823 | A7 | 3/1977 |
| FR | 2674376 | A1 | 9/1992 |
| GB | 1538766 | A | 1/1979 |

* cited by examiner

CYLINDER DEGASSING UNIT AND WORKING CYLINDER

FIELD AND BACKGROUND OF THE INVENTION

The invention relates to a cylinder degassing unit for venting a working cylinder and to a working cylinder comprising such a cylinder degassing unit.

In the case of single-acting lift- or pull-type cylinders, in particular, i.e. working cylinders which are only hydraulically actuated in one working direction and can be returned to the start position when being under load or controlled by spring force, dissolved gases and moisture can pass under the high pressure of the hydraulic pressure medium through the piston sealing into the empty movement chamber. This is aggravated by the negative pressure created in the empty chamber during the return movement of the piston, as the empty movement chamber is subject to a change in volume resulting from the stroke movement of the piston.

Consequently, the empty chamber must be vented again during the working movement. Degassing takes place in order to discharge such gases and to control the pressure ratios in the empty movement chamber. In the state of the art, an air exchange bore hole, which connects the empty movement chamber with the ambient atmosphere, is provided, for example, for this purpose.

To prevent outside air and the contained contamination from entering the empty movement chamber of the cylinder during the alternating piston movements, such an air exchange bore hole is provided, for example, with a functional element in the state of the art.

The state of the art describes various solutions for this issue. For example, pure filter elements made of porous material or valves with a one-sided self-locking function are known. They allow the trapped gas to escape. In addition, a backflow of the outside air and the dirt particles contained in it is prevented.

A technically well-engineered solution is described in the application for a utility model DE 20 2011 102 288 U1. The gas exchange barrier described therein specifies a non-return valve with an integrated filter element, which is designed as a module and, therefore, it is easy to install. A disadvantage of existing solutions is the design complexity, in particular.

SUMMARY OF THE INVENTION

The task of the invention is to disclose a cylinder degassing unit by means of which degassing of a cylinder residual movement chamber of a working cylinder can be provided in a structurally simple, cost-effective, particularly reliable manner and is adaptive to different parameters. Furthermore, the task is to disclose a working cylinder with such a cylinder degassing unit.

With regard to the cylinder degassing unit, the task is solved by the features listed in the independent claim. A working cylinder and preferred embodiments result from the associated dependent claims.

According to the invention, the basic components of the cylinder degassing unit are a basic body, an inner discharge portion, an annular chamber and an outer discharge portion.

The cylinder degassing unit is designed as a compact modular component. Typically, the cylinder degassing unit is used to vent or degas piston chambers in lift- or pull-type cylinders.

According to the invention, the cylinder degassing unit is based on the fact that there is a cylinder residual air space in a working cylinder which is not pressurized by a hydraulic pressure medium and its volume changes as a result of the stroke movement of the piston of the working cylinder. A wall perforation, which provides a connection between a cylinder residual air space and the outside atmosphere guided via the cylinder degassing unit, is provided on the working cylinder.

The basic body is used for the positionally fixed arrangement on a hydraulic working cylinder, hereinafter also abbreviated as a working cylinder. When the invention is used as intended, the basic body is arranged at least in portions in the wall perforation of the working cylinder.

The basic body has a concave contour, which preferably forms the annular chamber in the design of a circumferential annular gap or a circumferential annular groove. The concave contour is preferably designed as a tapered diameter of the basic body and forms, with the inner jacket of the wall perforation, a circumferential cavity which provides the annular chamber.

The volume of the annular chamber controls the storable air volume and the outgoing volume flow. Moreover, the annular chamber takes over the function of a pressurized chamber.

According to the invention, the inner discharge portion has an inner discharge channel and an inner elastomeric annular body.

The inner discharge channel is arranged in the basic body and, in particular, it can be provided as a bore hole. The inner discharge channel connects the cylinder residual air space with the annular chamber. At one end, the inner discharge channel has an inner inlet for this purpose which is arranged at the cylinder residual air space. An intermediate outlet on the annular chamber is located at the other end of the inner discharge channel.

The inner elastomeric annular body covers the intermediate outlet and is preloded. The inner elastomeric annular body is designed to form a first pressure barrier in an outlet direction and a second sealing plane in an inlet direction.

The outer discharge portion is constructed similarly to the inner discharge portion. It is also arranged in the basic body and has an outer discharge channel and an outer elastomeric annular body.

The outer discharge channel connects the annular chamber with the outside atmosphere. For this purpose, the preferably inclined outer discharge channel has an intermediate inlet at the cylinder residual air space at a first end and an outer outlet to the outside atmosphere at its opposite end. The outer elastomeric annular body covers the outer outlet. Like the inner elastomeric annular body, the outer elastomeric annular body is also preloaded and designed to form a second pressure barrier in the outlet direction and a first sealing plane in the inlet direction. When the second pressure barrier is overcome, the discharge medium exits into the low-pressure area of the atmosphere.

For the purposes of the present invention, the discharge direction is understood to be the direction from the inside to the outside, i.e. from the cylinder residual air space towards the outside atmosphere. The discharge direction describes the possible path of a discharge medium out of the cylinder residual air space into the outside atmosphere.

The inlet direction is understood to be the direction opposite to the outlet direction.

The order of the designation of the pressure barriers follows the discharge direction and the order of the designation of the sealing planes follows the inlet direction.

The discharge medium is in particular a gaseous medium such as air or gases that are degassed from the hydraulic pressure medium as a result of the pressure differences, or in some cases it can also be a hydraulic pressure medium that can enter the cylinder residual air space in smaller quantities due to stripping on the inner jacket of the working cylinder as a result of the piston movement or it can enter as a leakage flow, or it can also be condensates. Hereinafter, the discharge medium is sometimes also referred to as gas or air.

Depending on the operating condition, the sealing planes make it possible to make a division in a high-pressure range in the cylinder residual air space and the inner discharge channel, a medium-pressure range downstream of the inner elastomeric annular body in the annular chamber and the outer discharge channel up to the outer annular body and a low-pressure range in the outside atmosphere.

The material hardness, the preload after mounting on the basic body and the wall thickness of the respective elastomeric annular body as well as the opening cross-section of the intermediate outlet or the outer outlet define the pressure required for the outflow of the discharge medium.

Once the defined pressure is reached in the inner discharge channel, the inner elastomeric annular body expands and allows the discharge medium to escape into the annular chamber. Due to the closing force provided by the preload, a defined pressure also remains in the cylinder residual air space after the outflow.

The same applies to the outer outlet. Once the minimum pressure is reached, the outer elastomeric annular body expands and the outer outlet is not blocked.

The gas can escape from the intermediate chamber via the outer discharge channel and the outer outlet into the atmosphere. The preload of the outer elastomeric annular body defines the residual pressure value at which it closes the outer outlet. In this way, a defined pressure can be maintained in the annular chamber, here also referred to as the medium pressure range.

According to the invention, the air distribution module is further designed such that it has a complete discharge operating state, a partial discharge operating state and a closed operating state.

In the complete discharge operating state, there is a positive pressure in the cylinder residual air space compared to the outside atmosphere. This positive pressure overcomes the first and second pressure barriers and leads to a medium outlet of the discharge medium from the cylinder residual air space via the inner discharge portion, the annular chamber and the outer discharge portion into the outside atmosphere. In this case, the described different pressure conditions of high pressure in the cylinder residual air space, medium pressure in the annular chamber and low pressure in the outer atmosphere are provided.

In the partial discharge operating state, a positive pressure exists in the cylinder residual air space compared to the annular chamber. This positive pressure overcomes the first pressure barrier and the medium escapes from the cylinder residual air space via the inner discharge portion into the annular chamber. However, in the partial discharge operating state, the pressure difference is not so great that the second pressure barrier is also overcome. The first sealing plane remains closed.

In the closed operating state, neither the first nor the second pressure barrier is overcome. The inner discharge portion seals the cylinder residual air space from the annular chamber and the outer discharge portion seals the annular chamber against the outside atmosphere.

With the cylinder degassing unit according to the invention, a surprisingly simple design solution was found that provides several special advantages.

Both a valve effect and a pressure control are achieved in function integration by particularly simple and robust means.

Advantageously, a two-stage discharge path, first from the cylinder residual air space into the annular chamber and then secondly from there into the atmosphere, is provided by two barrier-forming elastomeric annular bodies. This design implements an airlock function. This means that the cylinder residual air space is not directly connected to the surroundings of the cylinder. This in turn leads to an increased protection of the cylinder residual air space against the harmful effects of the atmospheric environment. Dirt particles, harmful gases or aerosols are kept out in two stages and cannot enter the cylinder and damage it.

Advantageously, the annular chamber is already shielded from contamination by the outer discharge portion so that, in particular, the inner elastomeric annular body is specifically protected and its functionality is not impaired even under problematic conditions in the outside atmosphere.

Another advantage is the defined residual pressure in the annular chamber made possible by the invention. As a particular advantage, several advantageous effects can be achieved by the residual pressure in function integration.

On the one hand, the residual pressure is a stage of an advantageous pressure cascade, wherein it provides an intermediate pressure level between a possible maximum pressure in the cylinder residual air space and a merely atmospheric pressure in the outside atmosphere. The total pressure difference is thus advantageously divided into two stages.

On the other hand, there is the advantageous effect that even if a negative pressure is in the cylinder residual air space compared to the outside atmosphere, a positive pressure between the annular chamber and the outside atmosphere prevents outside air from entering the annular chamber.

By applying the residual pressure to the inner piston ring-viewed towards the inlet direction—the residual pressure supports the sealing effect of the inner piston ring in its closed operating state.

This allows to provide a negative pressure in the cylinder residual air space by an increase in its volume during a stroke movement of the piston without the risk that outside air and contaminated particles can enter. Thus, the working movement of the piston is supported and more energy-efficient.

It is also an advantage that reduced noise pollution is achieved by the transition of the outflowing air in at least two pressure stages during rapid piston movements. The discharge flow is buffered by the annular chamber. This avoids the loud hissing noises which are typical for conventional cylinders that discharge directly from the positive pressure range to the negative pressure range.

Another advantage is the simplicity of the design. The basic body can be easily provided as a turned-milled part. The elastomeric ring bodies can be designed as simple hose sections or rubber rings. This design has the advantage of being particularly robust. In addition, the annular bodies can be easily replaced and thus renewed if necessary. Advantageously, the basic body can be arranged in a wall perforation in such a way that it protrudes axially outwards with the outer discharge portion so that the outer elastomeric annular body, which is potentially subject to greater stress due to environmental influences, can be replaced without dismounting the cylinder degassing unit from the wall perforation and preferably even without the use of tools.

Furthermore, by selecting the preload of the elastomeric annular bodies, it is possible to specify the desired pressures in the cylinder residual air space and in the annular chamber for specific applications though using the same basic body with the same dimensions of the discharge channels and outlets. In addition, further adaptation is also possible by changing the cross-sections of the outlets.

In a first advantageous further development of the cylinder degassing unit according to the preceding claim, the basic body has a cylindrical basic shape and is accommodated in a wall perforation, formed as a hollow cylindrical bore hole, in the wall of the cylinder residual air space.

Advantageously, the basic body can be designed with an external thread that engages in a corresponding internal thread of the wall perforation of the working cylinder. However, other connections are also possible, for example as press fits.

According to a further advantageous embodiment, the inner elastomeric annular body and the outer elastomeric annular body are identical in construction.

This further development allows for a further design simplification and optimization. If different differential pressures are nevertheless to be provided by means of the inner elastomeric annular body at the intermediate outlet as the first pressure barrier and by means of the outer elastomeric annular body at the outer outlet as the second pressure barrier, this will still be possible, for example by selecting different cross-sections of the respective outlets of the discharge channels or different diameters of the bearing seats of the elastomeric annular bodies.

In another advantageous further development of the cylinder degassing unit, the annular chamber is formed by the concave contour of the basic body and an inner jacket of the wall perforation.

The concave contour of the basic body can be produced in a cost-effective and simple manner, preferably by turning off material. However, it is also possible to mill out a non-radial-symmetrical concave contour. The geometric design of the concave contour of the basic body, in conjunction with the generally cylindrical inner jacket, defines the shape and volume of the annular chamber. In this way, the pressure conditions and the flow behaviour can be influenced in a target-oriented manner.

In another advantageous further development of the cylinder degassing unit, the annular chamber in the closed operating state is designed for a positive pressure relative to the outside atmosphere.

The positive pressure creates an airlock function in the annular chamber. The entering of dirt or otherwise contaminated air is prevented by the permanently existing positive pressure. The positive pressure in the annular chamber is maintained during a stroke movement of the piston and in every possible piston position as well as in every possible pressure condition of the cylinder residual air space. The positive pressure in the annular chamber prevents external air and contamination from entering the annular chamber and supports the sealing effect of the inner elastomeric annular body in its function as a second sealing plane.

In another advantageous further development of the cylinder degassing unit, it has an inner O-ring which is designed for a sealing contact with the wall perforation and forms a sealing plane between the cylinder residual air space and the annular chamber.

This further development demonstrates a way of further simplifying the structural design and increasing the effectiveness of the pressure control function and valve function.

In another advantageous further development of the cylinder degassing unit, it has an outer O-ring which is designed for a sealing contact with the wall perforation and forms a sealing plane between the annular chamber and the outside atmosphere.

A further simplification of the structural design and an increase in the effectiveness of the pressure control function and valve function is also provided here-a in the same way as with the inner O-ring.

In another advantageous further development of the cylinder degassing unit according to the preceding claims, it has a further inner discharge portion and a further annular chamber, which are functionally arranged in series with the inner discharge portion and the annular chamber.

The further development is based on the further particular advantage that the multi-stage design can be further extended with a third or further stage.

Depending on the application with different piston movement speeds and applied pressure ranges, further pressure stages can be connected in series in the cylinder degassing unit. This allows the control and further improvement of damping, noise generation and the behaviour of the outflowing gases. In addition, the pressure difference to be achieved between the individual pressure stages is advantageously reduced while maintaining the same total pressure difference between the cylinder residual air space and the outside atmosphere.

A further aspect of the present invention relates to a working cylinder. It has a cylinder residual air space with an associated wall perforation, which provides a passage.

In addition, this working cylinder according to the invention has a cylinder degassing unit according to the invention, which is arranged at the wall perforation. The cylinder degassing unit is designed according to the independent claim.

Advantageously, the working cylinder according to the invention is designed as a single-acting hydraulic working cylinder which is actuated only in one working direction by a fluid. The empty movement chamber delimited by the piston with its piston sealing forms the cylinder residual air space. The empty movement chamber is, for example, the piston chamber in the case of a pull-type cylinder and the piston rod chamber in the case of a pressure-type cylinder. Furthermore, the working cylinder is designed in a manner known per se.

The invention is explained as an exemplary embodiment in more detail by means of the following figures. They show:

DETAILED DESCRIPTION OF THE INVENTION

Figure 1:
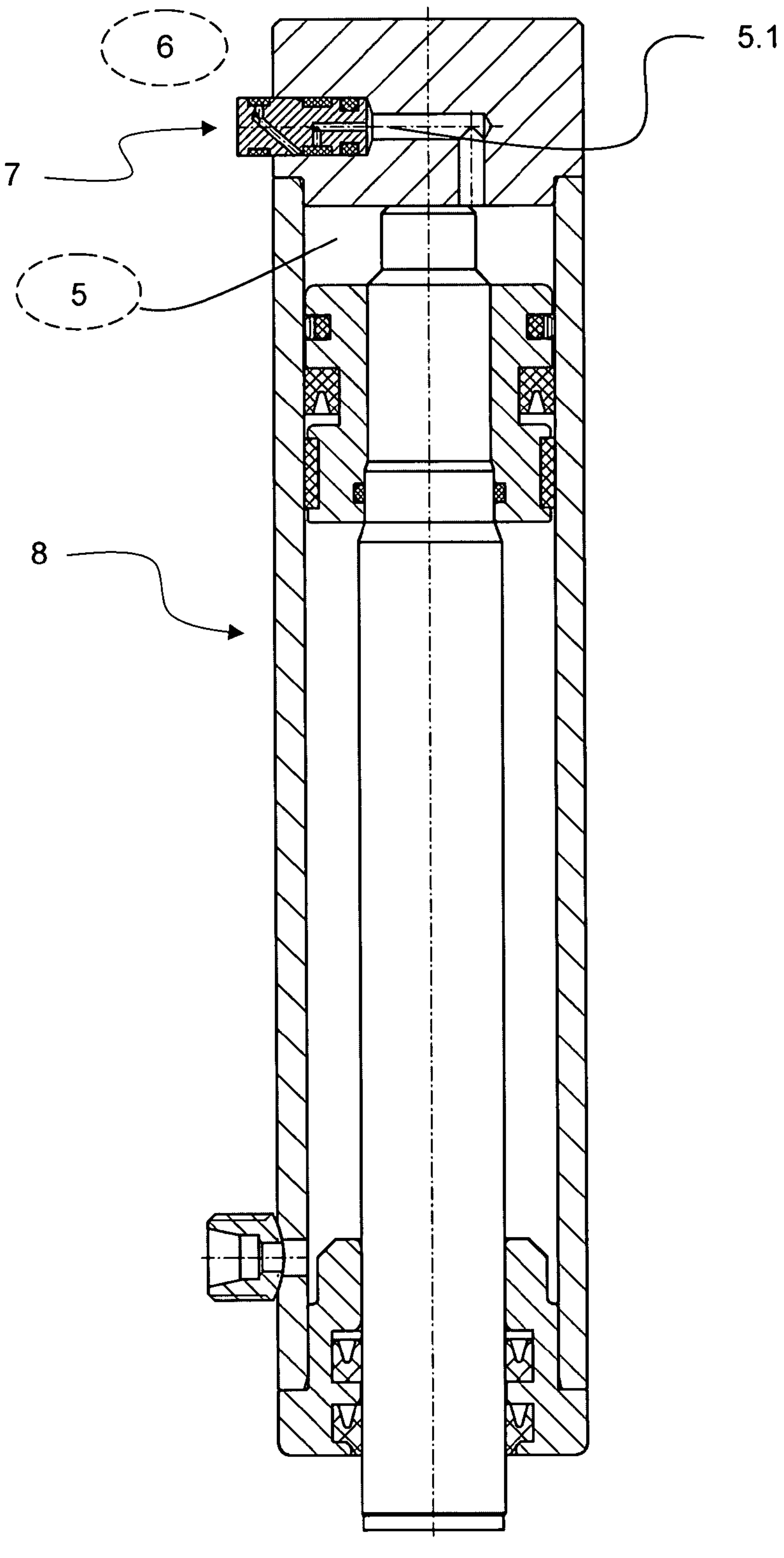
FIG. 1 Schematic sectional view of the working cylinder

The same reference numerals in the various figures refer to the same features or components. The reference numerals are also used in the description if they are not shown in the relevant figure.

FIG. 1 shows a schematic sectional view of an exemplary embodiment of the working cylinder 8 with the mounted cylinder degassing unit 7.

In this exemplary embodiment, the working cylinder 8 is a hydraulic pull-type cylinder. It has a lateral pressurizing medium connection in the cylinder wall, through which the pressurizing medium can be applied to the piston rod chamber. In this way, pressure is applied to the annular surface of the piston facing the guide closure part and the piston with coupled piston rod performs an inward stroke movement. The cylinder residual air space is not pressurized but remains empty. The volume of the cylinder residual air space 5 changes as a result of the stroke movement.

In the exemplary embodiment, the cylinder degassing unit 7 is positioned with a connection to the cylinder residual air space 5 in a widened section of the wall perforation 5.1, which is designed as a bore hole and assigned to the cylinder residual air space 5 and forms a uniform pressure chamber with it. Due to this arrangement, the cylinder degassing unit 7 can vent the cylinder residual air space 5 during a retracting piston movement. Further details of the cylinder degassing unit 7 are shown in FIG. 2 below.

Figure 2:
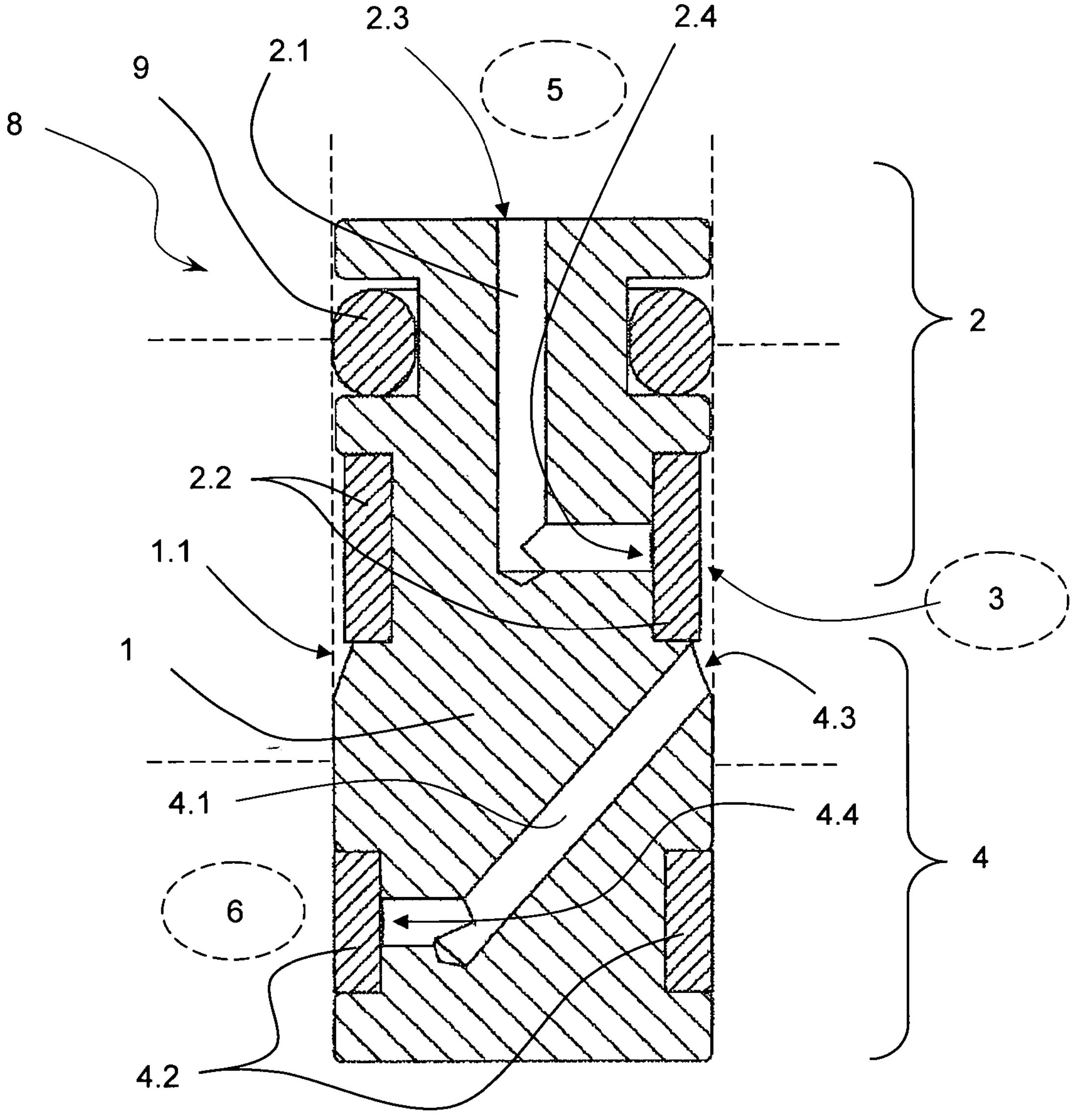
FIG. 2 Schematic sectional view of the cylinder degassing unit.

FIG. 2 shows a schematic sectional view of the cylinder degassing unit 7.

It consists of the basic body 1, an inner discharge portion 2 and an outer discharge portion 4. Furthermore, the annular chamber 3 is formed by the concave contour 1.1 of the basic body 1.

When installed as intended, the inner discharge portion 2 is arranged in the wall perforation 5.1 of the working cylinder, which is designed as a bore hole, and is pressure-connected to the cylinder residual air space 5 by its inner discharge channel 2.1. The inner discharge channel 2.1 begins with the inner inlet 2.3 at the cylinder residual air space 5 at the bore hole and leads to the intermediate outlet 2.4, with which it leads into the annular chamber 3. The intermediate outlet 2.4 is covered by the inner elastomeric annular body 2.2, which is designed as a stretched rubber ring or plastic ring with a flat cross-section in the exemplary embodiment. The sealing and pressure separation between the cylinder residual air space 5 and the annular chamber 3 are provided by the inner O-ring 9 in the exemplary embodiment.

The outer discharge portion 4 is designed in the same way and consists of the outer discharge channel 4.1 and the outer elastomeric annular body 4.2. Designed as a bore hole, the outer discharge channel 4.1 penetrates the basic body 1. The outer discharge channel 4.1 has a pressure connection with the intermediate inlet 4.3 to the annular chamber 3 and ends in the discharge direction with the outer outlet 4.4 at the outer elastomeric annular body 4.2 and thus leads to the outside atmosphere 6, which is not part of the device according to the invention.

For an active stroke movement of the pull-type cylinder of the exemplary embodiment, the hydraulic pressurizing medium is guided into the piston rod chamber, where it moves the piston in the direction of the piston bottom. The volume in the piston chamber decreases and the pressure of a discharge medium accumulated there increases. In this case, the piston chamber is the cylinder residual air space 5.

In the event of a positive pressure existing in the cylinder residual air space 5, which is so high that it overcomes the preload of the elastomeric annular body 2.2, the gases to be discharged flow into the inner discharge channel 2.1 via the inner inlet 2.3 and flow through it to the intermediate outlet 2.4 and from there they flow past the inner elastomeric annular body into the annular chamber 3. In the exemplary embodiment, the annular chamber 3 is a circumferential cavity formed by the concave contour 1.1 of the basic body 1 and by the wall of the bore hole, shown schematically here by the vertical dashed lines.

The intermediate outlet 2.4 is closed by the inner elastomeric annular body 2.2 and the inner elastomeric annular body 2.2 only opens when a specific pressure is provided. It passes from the positive pressure area in the working cylinder in its cylinder residual air space 5 into the medium-pressure area of an annular chamber 3. Due to the pressure difference, the annular chamber 3 is filled with the discharge medium.

Then, the gases flow into the outer discharge portion 4. The gases flow into the outer discharge channel 4.1 via the intermediate inlet 4.3. The outer outlet 4.4 is closed by the outer elastomeric annular body 4.2. This one also opens at a certain pressure of the gas and allows it to flow into the outside atmosphere, the negative pressure area.

During a passive stroke movement of the piston in the extension direction, the volume in the piston chamber increases again and the pressure drops. Both elastomeric annular bodies 2.2, 4.2 are in contact with the respective associated outlets 2.4, 4.4, close them off and thus form a first and a second sealing plane. Even if the pressure in the cylinder residual air space 5 is now lower than in the outside atmosphere 6, a relative positive pressure remains in the annular chamber 3 compared to the outside atmosphere 6 due to the closure of the intermediate outlet 2.4 by the inner elastomeric annular body 2.2—as the second sealing level—and due to the preload of the outer elastomeric annular body 4.2 at the outer outlet as the second pressure barrier. This relative positive pressure reliably prevents outside air from entering. This is the closed operating state.

The circles around the reference numerals 5, 3 and 6 illustrate the different pressure zones. Furthermore, the horizontal dashed lines schematically show the delimitation of the different pressure zones.

REFERENCE NUMERALS

1 Basic body
1.1 Concave contour
2 Inner discharge portion
2.1 Inner discharge channel
2.2 Inner elastomeric annular body
2.3 Inner inlet
2.4 Intermediate outlet
3 Annular chamber
4 Outer discharge portion
4.1 Outer discharge channel
4.2 Outer elastomeric annular body
4.3 Intermediate inlet
4.4 Outer outlet
5 Cylinder residual air space
5.1 Wall perforation
6 Outside atmosphere
7 Cylinder degassing unit
8 Working cylinder
9 Inner O-ring

The invention claimed is:

1. A cylinder degassing unit, comprising:

a basic body having an inner discharge portion, an outer discharge portion, and an annular chamber defined by a concave contour in said basic body;

said basic body being constructed for being arranged in a positionally fixed manner on a working cylinder at a wall perforation of a cylinder residual air space of the working cylinder;

said inner discharge portion having an inner discharge channel and an inner elastomeric annular body, said inner discharge channel being arranged in said basic body and for connecting the cylinder residual air space to said annular chamber, said inner discharge portion having an inner inlet at the cylinder residual air space and an intermediate outlet at said annular chamber, said inner elastomeric annular body covering said intermediate outlet, said inner elastomeric annular body being preloaded and configured for defining a first pressure barrier in a discharge direction and for defining a second sealing plane in an inlet direction;

said outer discharge portion having an outer discharge channel and an outer elastomeric annular body, said outer discharge channel being arranged in the basic body, said outer discharge channel connecting said annular chamber to atmosphere, said outer discharge portion having an intermediate inlet at said annular chamber and an outer outlet to atmosphere, said outer elastomeric annular body covering said outer outlet, said outer elastomeric annular body being preloaded and configured for defining a second pressure barrier in an outlet direction and for defining a first sealing plane in the inlet direction;

the cylinder degassing unit being constructed for having a complete discharge operating state, a partial discharge operating state and a sealing operating state;

in the complete discharge operating state, there is a positive pressure in the cylinder residual air space relative to atmosphere, for overcoming said first and second pressure barriers and providing a media outlet from the cylinder residual air space to atmosphere via said inner discharge portion, said annular chamber and said outer discharge portion;

in the partial discharge operating state there is a positive pressure in the cylinder residual air space relative to the annular chamber for overcoming said first pressure barrier and providing a media outlet from the cylinder residual air space into said annular chamber via said inner discharge portion; and in the closed operating state, said first and second pressure barriers being maintained and sealing the cylinder residual air space from said annular chamber and sealing said annular chamber from atmosphere.

2. The cylinder degassing unit according to claim 1, wherein said basic body has a cylindrical shape and is configured to be accommodated in the wall perforation, formed as a hollow cylindrical bore hole.

3. The cylinder degassing unit according to claim 1, wherein said inner and outer elastomeric annular bodies are identical in construction.

4. The cylinder degassing unit according to claim 1, wherein said annular chamber is defined by the concave contour of the basic body and an inner jacket of the wall perforation.

5. The cylinder degassing unit according to claim 1, wherein in the closed operating state, said annular chamber is configured for a positive pressure relative to atmosphere.

6. The cylinder degassing unit according to claim 1, comprising an inner O-ring configured for a sealing contact with the wall perforation and for defining a sealing plane between the cylinder residual air space and the annular chamber.

7. A working cylinder, comprising:

a cylinder residual air space and a wall perforation; and a cylinder degassing unit according to claim 1 arranged at the wall perforation.

* * * * *